US006367026B1

(12) United States Patent
Chou et al.

(10) Patent No.: US 6,367,026 B1
(45) Date of Patent: Apr. 2, 2002

(54) UNBALANCED CLOCK TREE FOR A DIGITAL INTERFACE BETWEEN AN IEEE 1394 SERIAL BUS SYSTEM AND A PERSONAL COMPUTER INTERFACE (PCI)

(75) Inventors: Chen-Chi Chou, Milpitas; Jose L. Diaz, San Jose, both of CA (US)

(73) Assignees: Sony Corporation, Tokyo (JP); Sony Electronics, Inc., Park Ridge, NJ (US)

( * ) Notice: Subject to any disclaimer, the term of this patent is extended or adjusted under 35 U.S.C. 154(b) by 0 days.

(21) Appl. No.: 09/241,325

(22) Filed: Feb. 1, 1999

(51) Int. Cl.$^7$ ................................................ G06F 1/10
(52) U.S. Cl. ........................................ 713/401; 713/503
(58) Field of Search ................................ 713/400, 401, 713/500, 503

(56) References Cited

U.S. PATENT DOCUMENTS

| | | | |
|---|---|---|---|
| 4,063,308 A | * 12/1977 | Collins et al. | 364/200 |
| 5,052,029 A | 9/1991 | James et al. | 375/107 |
| 5,404,459 A | 4/1995 | Gulick et al. | 395/275 |
| 5,442,475 A | * 8/1995 | Bausman et al. | 359/140 |
| 5,448,562 A | 9/1995 | Osakabe et al. | 370/85.1 |
| 5,450,550 A | 9/1995 | Ito et al. | 395/821 |
| 5,473,727 A | 12/1995 | Nishiguchi et al. | 395/2.31 |
| 5,504,585 A | 4/1996 | Fujinami et al. | 358/335 |
| 5,517,508 A | 5/1996 | Scott | 371/37.1 |
| 5,519,351 A | * 5/1996 | Matsumoto | 327/295 |
| 5,570,330 A | 10/1996 | Okawa | 369/44.32 |
| 5,592,450 A | 1/1997 | Yonemitsu et al. | 369/48 |
| 5,596,373 A | 1/1997 | White et al. | 348/569 |
| 5,600,664 A | 2/1997 | Hayashi | 371/43 |
| 5,608,730 A | 3/1997 | Osakabe et al. | 370/471 |
| 5,619,157 A | 4/1997 | Kumata et al. | 327/203 |
| 5,623,644 A | * 4/1997 | Self et al. | 713/503 |
| 5,628,025 A | 5/1997 | Chung et al. | 395/800 |
| 5,849,610 A | * 12/1998 | Zhu | 438/129 |
| 5,948,079 A | 9/1999 | Tsai et al. | 710/20 |
| 6,032,190 A | 2/2000 | Bremer et al. | 709/238 |

OTHER PUBLICATIONS

IEEE, "1394–1995 Standard for a High Performance Serial Bus," 1995, USA.
IEC, "61883–1998 Standard for Digital Interface for Consumer Audio/Video Equipment," Parts 1–5, Edition 1.0, Feb. 1998.

* cited by examiner

Primary Examiner—Dennis M. Butler
(74) Attorney, Agent, or Firm—Haverstock & Owens LLP

(57) ABSTRACT

A method of and apparatus for providing clock signals for synchronizing operation of elements of a digital interface system between an IEEE 1394 serial bus and a personal computer interface (PCI) bus. The digital interface system includes a number of functional elements in addition to a PCI interface element. Each of the functional elements and the PCI interface element receives a system clock signal via a clock tree. The clock tree derives individual clock signals from the system clock and provides these individual clock signals to each of the functional elements. The clock tree is balanced such that each clock transition occurs at each of the functional elements, other than the PCI interface element, at substantially the same time. Clock balancing is achieved through appropriate circuit layout and insertion of delay elements. The clock tree also derives a clock signal for the PCI interface element from the system clock signal. The portion of the clock tree which provides this clock signal to the PCI interface is not balanced with respect to the remainder of the clock tree. Rather, this portion of the clock tree is conditioned to provide a minimum of delay so as to comply with timing requirements for the PCI bus, such as data set-up and hold times associated with transitions in this clock signal. Accordingly, portions of the clock tree are balanced while at least a portion of the clock tree is not balanced.

23 Claims, 4 Drawing Sheets

UNBALANCED CLOCK TREE FOR A DIGITAL INTERFACE BETWEEN AN IEEE 1394 SERIAL BUS SYSTEM AND A PERSONAL COMPUTER INTERFACE (PCI)

FIELD OF THE INVENTION

The present invention relates to the field of providing clock signals for synchronizing operation of elements of a digital system. More particularly, the present invention relates to providing clock signals for synchronizing operation of elements of a digital interface system between an IEEE 1394 serial bus and a personal computer interface (PCI) device.

BACKGROUND OF THE INVENTION

Digital systems, such as special purpose logic circuits and general purpose programmable computer systems, typically include a number of elements, such as logic and functional blocks, which operate in synchronism to implement functions of the digital system. Many of these synchronous elements within the system are supplied a clock signal from either a clock generated externally to the system or a local clock generated within the system. This clock signal synchronizes the operation of the synchronous elements so as to propagate control signals and data through the system. The clock signal serves as a timing reference to ensure that each synchronous element executes its operations at an appropriate time and in an appropriate sequence.

A difficultly arises in that a finite amount of time is generally required for the clock signal to propagate from its source to each of the various synchronous elements of the system. Differences between propagation times required for the clock signal to reach each synchronous element become increasingly significant as clock frequencies increase. A further difficulty arises when the digital system must interface with the outside world where timing considerations for this interface are not entirely controlled by the digital system.

A standard adopted by the Institute for Electrical and Electronics Engineers (IEEE), "IEEE 1394-1995 Standard For A High Performance Serial Bus," is an international standard for implementing an economical high-speed serial bus architecture. This standard provides a universal input/output connection for interconnecting digital devices including, for example, audio-visual equipment and personal computers.

The IEEE 1394-1995 standard supports both asynchronous and isochronous format data transfers. Asynchronous transfers are data transfer operations which transfer data from a source node to a destination node and take place as soon as permitted after initiation. An example of an application appropriate for asynchronous data transfer is communication of a still image or text document. Control commands can also be sent asynchronously.

Isochronous data transfers are real-time data transfers which take place such that time intervals between significant instances have the same duration at both the transmitting and receiving applications. An example of an application suitable for the transfer of data isochronously is the transfer of audio-visual data (AV data) between devices, such as a video camera and a television set. The video camera records sounds and images (AV data) and stores the data in discrete segments on tape. Each segment represents the image and/or sound recorded over a limited period of time. The video camera then transfers each segment in a packetized manner during an appropriate interval for reproduction by the television set.

The IEEE 1394-1995 standard bus architecture provides multiple channels for isochronous data communication between applications. A six-bit channel number is broadcast with the data to allow reception by the appropriate application. This allows multiple applications to concurrently communicate isochronous data across the bus structure without interfering with each other.

The cable required by the IEEE 1394-1995 standard is relatively thin in size compared to other bulkier cables used to connect such devices. The IEEE 1394-1995 cable environment is a network of nodes connected by point-to-point links, each link including a port for each node's physical connection and the cable between them. The physical topology for the cable environment of an IEEE 1394-1995 serial bus is a non-cyclic network of multiple ports, with finite branches. A primary restriction on the cable environment is that nodes must be connected together without forming any closed loops.

Devices can be added and removed from an IEEE 1394-1995 bus while the bus is active. If a device is so added or removed, the bus automatically reconfigures itself for transmitting data between the then existing nodes. A node is considered a logical entity with a unique address on the bus structure. Each node provides an identification ROM, a standardized set of control registers and its own address space.

The IEEE 1394-1995 cables connect ports together on different nodes. Each port includes terminators, transceivers and logic. A node can have multiple ports at its physical connection. The cable and ports act as bus repeaters between the nodes to simulate a single logical bus. The cable physical connection at each node includes one or more ports, arbitration logic, a resynchronizer and an encoder. Each of the ports provide the cable media interface into which the cable connector is connected. The arbitration logic provides access to the bus for the node. The resynchronizer takes received data-strobe encoded data bits and generates data bits synchronized to a local clock for use by the applications within the node. The encoder takes either data being transmitted by the node or data received by the resynchronizer, which is addressed to another node, and encodes it in data-strobe format for transmission across the IEEE 1394-1995 serial bus. Using these components, the cable physical connection translates the physical point-to-point topology of the cable environment into a virtual broadcast bus, which is expected by higher layers of the system. This is accomplished by taking all data received on one port of the physical connection, resynchronizing the data to a local clock and repeating the data out of all of the other ports from the physical connection.

A bus standard commonly utilized for personal computers is known as personal computer interface (PCI). Thus, personal computers typically include an internal PCI bus which operates according to this standard. When a personal computer system is transmitting and receiving data over an IEEE 1394-1995 serial bus, the serial bus must be interfaced to the internal PCI bus. Clock signals must also be provided to synchronize operation.

SUMMARY OF THE INVENTION

The invention is a method of and apparatus for providing clock signals for synchronizing operation of elements of a digital interface system between an IEEE 1394 serial bus and a personal computer interface (PCI) bus. The digital interface system includes a number of functional elements in addition to a PCI interface element. Each of the functional elements and the PCI interface element receives a system clock signal via a clock tree. The clock tree derives individual clock signals from the system clock and provides these individual clock signals to each of the functional elements. The clock tree is balanced such that each clock transition occurs at each of the functional elements, other than the PCI interface element, at substantially the same time. Clock balancing is achieved through appropriate circuit layout and insertion of delay elements. The clock tree also derives a clock signal for the PCI interface element from the system clock signal. The portion of the clock tree which provides this clock signal to the PCI interface is not balanced with respect to the remainder of the clock tree. Rather, this portion of the clock tree is conditioned to provide a minimum of delay so as to comply with timing requirements for the PCI bus, such as data set-up and hold times associated with transitions in this clock signal. Accordingly, portions of the clock tree are balanced while at least a portion of the clock tree is not balanced.

According to an aspect of the present invention, an apparatus for synchronizing operation of elements of an interface system between a serial bus and a computer system bus includes an oscillator conditioned to generate a clock signal, a first pathway coupled to the oscillator, wherein the first pathway delivers the clock signal to a first functional element and wherein the first pathway is associated with a first delay for delivering the clock signal to the first functional element, and a balanced plurality of additional pathways, each coupled to the oscillator, wherein the balanced plurality of additional pathways deliver the clock signal to each of a plurality of additional functional elements included in the digital interface system and wherein each of the plurality of pathways is associated with a respective delay for delivering the clock signal to a respective one of the plurality of additional functional elements, wherein the balanced plurality of additional pathways are balanced with respect to each other such that their respective delays are substantially equal and such that each respective delay is longer than the first delay. Preferably, the first functional element interfaces to the computer system bus. In addition, the serial bus can communicate isochronous and asynchronous data packets. Preferably, the serial bus is an IEEE 1394-1995 serial bus. The system bus can be a personal computer interface (PCI) bus.

According to another aspect of the present invention, an apparatus for synchronizing operation of elements of an interface system between a serial bus and a computer system bus includes means for generating a clock signal, first means for delivering coupled to the means for generating, for delivering the clock signal to a first functional element and having an associated first delay for delivering the clock signal to the first functional element, and second means for delivering coupled to the means for generating, for delivering the clock signal to a plurality of additional functional elements included in the digital interface system and having a plurality of balanced delays for delivering the clock signal to each respective additional functional element, wherein the plurality of balanced delays are substantially equal and wherein the first means is configured such that the first delay is shorter than a shortest one of the balanced delays. Preferably, the first functional element interfaces to the computer system bus. In addition, the serial bus can communicate isochronous and asynchronous data packets. Preferably, the serial bus is an IEEE 1394-1995 serial bus. The system bus can be a personal computer interface (PCI) bus.

According to another aspect of the present invention, a method of synchronizing operation of elements of an interface system between a serial bus and a computer system bus includes steps of generating a clock signal, minimizing a delay time for delivering the clock signal to a first functional element of the interface system thereby forming a minimized delay time, and balancing additional delay times for delivering the clock signal to a plurality of additional functional elements wherein the minimized delay time is shorter than the balanced delay times. The method can include a step of communicating data between the serial bus and the computer system bus. Further, the method can include a step of communicating an isochronous data packet via the interface system. Still further, the method can include a step of communicating an asynchronous data packet via the interface system.

According to yet another aspect of the present invention, a computer system includes a system bus, and an interface circuit coupled to the system bus and configured for coupling to a serial bus. The interface circuit includes a system bus interface circuit coupled to the system bus, a plurality of functional elements coupled to the system bus interface circuit for communicating data between the serial bus and the system bus interface circuit, and a clock delivery system coupled to the system bus interface circuit for delivering a clock signal to the system bus interface circuit and having a first delay time for delivering the clock signal to the system bus interface circuit and coupled to the plurality of functional elements for delivering the clock signal to each of the plurality of functional elements and having a plurality of substantially balanced delay times for delivering the clock signal to each of the plurality of functional elements, wherein the balanced delay times are each longer than the first delay time. The serial bus can communicate isochronous and asynchronous data packets. Preferably, the serial bus is an IEEE 1394-1995 serial bus. In addition, the system bus can be a personal computer interface (PCI) bus.

According to another aspect of the present invention, an interface system for communicating data between a serial bus and a computer system bus includes a bus interface circuit for providing an interface to the computer system bus, a plurality of direct memory access (DMA) engines coupled to the bus interface circuit, an internal bus coupled to the DMA engines, a plurality of buffers coupled to the internal bus, a interface device coupled to the plurality of buffers wherein the interface device provides an interface to the serial bus, an unbalanced clock tree for providing a clock signal to the bus interface circuit, to the plurality of DMA engines and to the plurality of buffers wherein delay times for providing the clock signal to each of the plurality of DMA engines and buffers are substantially equal and wherein a delay time for providing the clock signal to the bus interface circuit is shorter than any of the delay times for providing the clock signal to each of the plurality of DMA engines and buffers, and an oscillator coupled to the clock tree for generating the clock signal. The serial bus can communicate isochronous and asynchronous data packets. Preferably, the serial bus is an IEEE 1394-1995 serial bus. The system bus can be a personal computer interface (PCI) bus. In addition, the interface system can include a plurality of aligner circuits, one for each buffer, wherein the aligner circuits are coupled between the internal bus and each respective buffer.

DETAILED DESCRIPTION OF THE PREFERRED EMBODIMENT

Figure 1:
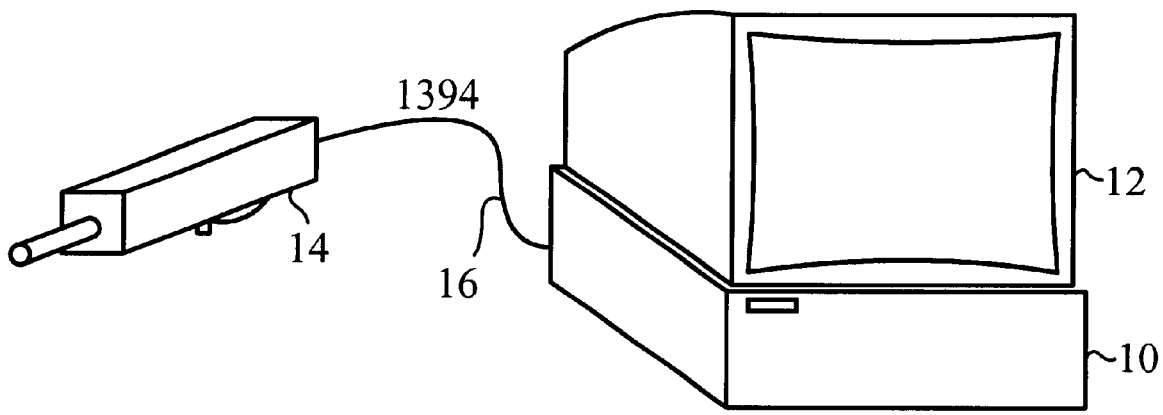
FIG. 1 illustrates a block diagram of an IEEE 1394-1995 serial bus network according to the present invention including a computer system and a video camera.

A block diagram of an exemplary IEEE 1394-1995 serial bus network including a computer system 10 and a video camera 14 is illustrated in FIG. 1. The computer system 10 includes an associated display 12 and is coupled to the video camera 14 by an IEEE 1394 serial bus cable 16. The serial bus cable 16 forms a segment of the network which couples two nodes together, namely, the computer system 10 and the camera 14. The computer system 10 can also include one or more audio speakers. Audio-visual data (AV data) and other associated data are sent between the video camera 14 and the computer system 10 via the IEEE 1394 serial bus cable 16. Though only two nodes are illustrated in FIG. 1, it will be apparent that the 1394 network can include additional nodes.

Figure 2:
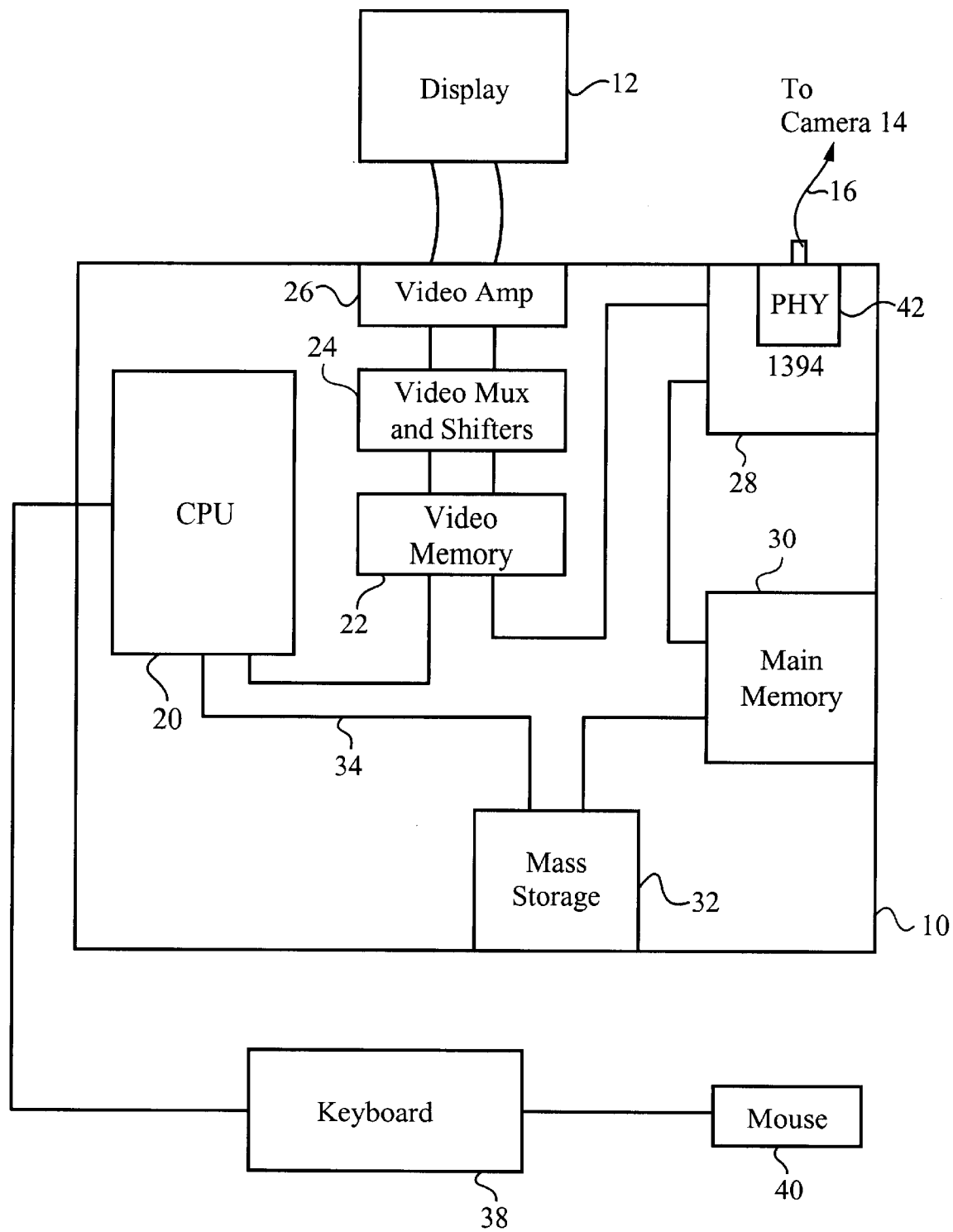
FIG. 2 illustrates a block diagram of internal components of the computer system illustrated in FIG. 1 according to the present invention.

A block diagram of internal components of the computer system 14 is illustrated in FIG. 2. The computer system 10 includes a central processor unit (CPU) 20, a main memory 30, a video memory 22, a mass storage device 32 and an IEEE 1394-1995 interface circuit 28, all coupled together by a conventional bi-directional system bus 34. In the preferred embodiment the system bus 34 is a personal computer interface (PCI) bus.

The interface circuit 28 interfaces with the system bus 34 and includes a physical interface circuit 42 for sending and receiving communications via the IEEE 1394 serial bus. The physical interface circuit 42 is coupled to the camera 14 via the IEEE 1394 serial bus cable 16. In the preferred embodiment of the present invention, the interface circuit 28 is implemented on an IEEE 1394-1995 interface card within the computer system 10. However, it should be apparent to those skilled in the art that the interface circuit 28 can be implemented within the computer system 10 in any other appropriate manner, including building the interface circuit onto the motherboard itself.

The mass storage device 32 can include both fixed and removable media using any one or more of magnetic, optical or magneto-optical storage technology or any other available mass storage technology. The system bus 34 contains an address bus for addressing any portion of the memory 22, 30 and 32. The system bus 34 also includes a data bus for transferring data between and among the CPU 20, the main memory 30, the video memory 22, the mass storage device 32 and the interface circuit 28.

The computer system 10 is also coupled to a number of peripheral input and output devices including a keyboard 38, a mouse 40 and the associated display 12. The keyboard 38 is coupled to the CPU 20 for allowing a user to input data and control commands into the computer system 10. A conventional mouse 40 is coupled to the keyboard 38 as a cursor control device for manipulating graphic images on the display 12.

A port of the video memory 22 is coupled to a video multiplex and shifter circuit 24, which in turn is coupled to a video amplifier 26. The video amplifier 26 drives the display 12. The video multiplex and shifter circuitry 24 and the video amplifier 26 convert pixel data stored in the video memory 22 to raster signals suitable for use by the display 12.

Figure 3:
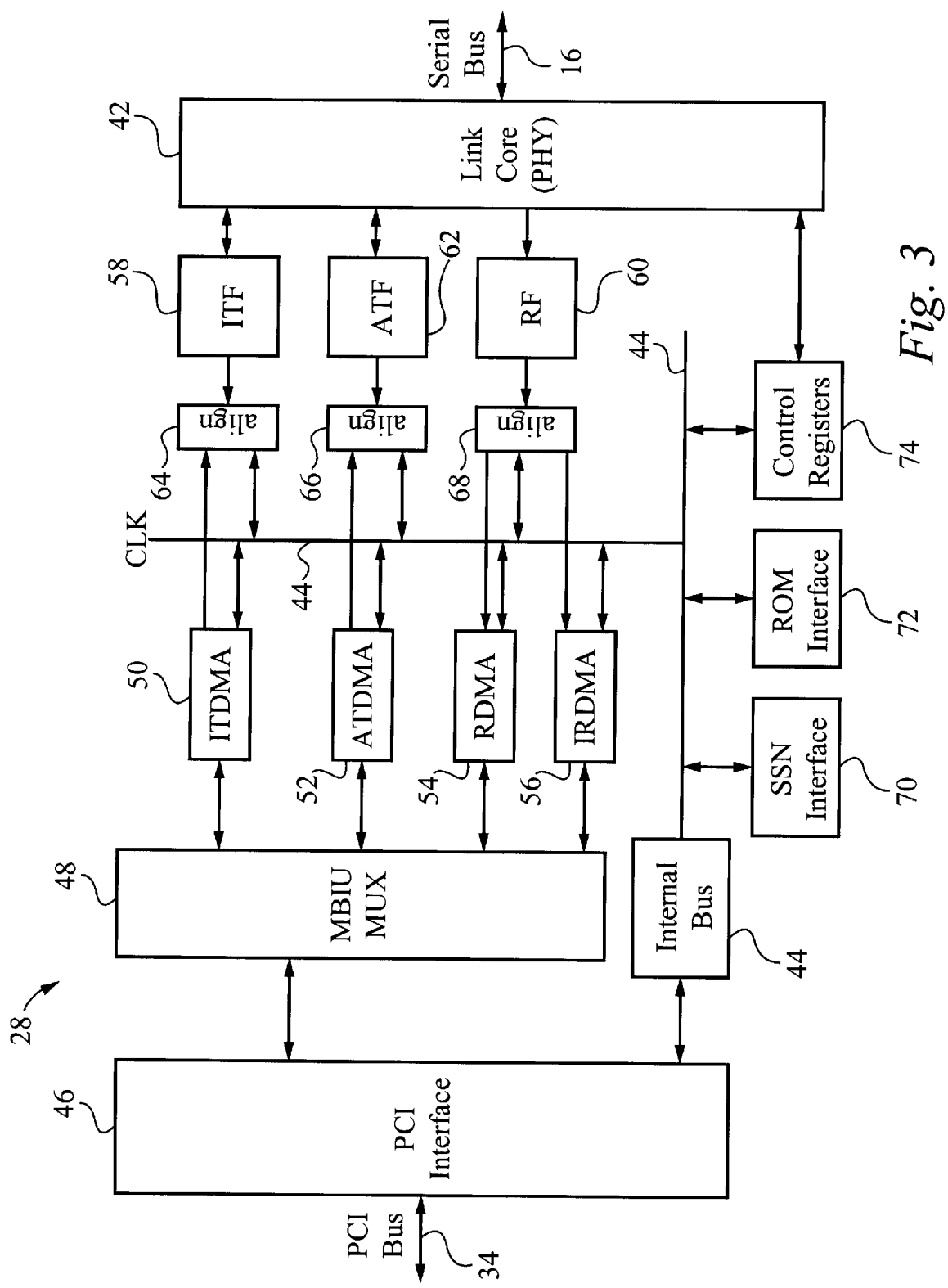
FIG. 3 illustrates a schematic block diagram of a digital interface system illustrated in FIG. 2 for interfacing the IEEE 1394 serial bus to a personal computer interface (PCI) bus according to the present invention.

FIG. 3 illustrates a schematic block diagram of the interface system 28 illustrated in FIG. 2 for interfacing an IEEE 1394 serial bus to a personal computer interface (PCI) bus according to the present invention. In the preferred embodiment, the interface system 28 is implemented as a single integrated circuit chip, though it will be apparent that all of its functions need not be integrated into a single chip. The interface 28 includes an internal bus 44 which serves as a central address decoder and data bus multi-plexor for the interface system 28. The internal bus 44 provides an interconnection between all addressable entities within the interface 28.

The personal computer interface (PCI) system bus 34 is coupled to a PCI interface block 46. The PCI interface block 46 decodes and responds to accesses to registers within the interface 28 and also generates transactions on the system bus 34. Thus, the PCI interface 46 moves streams of data between one or more of the memory devices 22, 30, 32 (FIG. 2) and the 1394-1995 serial bus 16 via the interface system 28.

The PCI interface 46 is coupled to a master bus interface unit multiplexor (MBIU MUX) 48. The MBIU MUX 48 is coupled to four direct memory access (DMA) engines 50, 52, 54, 56. The MBIU MUX 48 receives requests from the DMA engines 50, 52, 54, 56, appropriately prioritizes the requests, and grants the highest priority request access to the PCI interface 46. Registers within the DMA engines 50, 52, 54, 56, are utilized for initializing DMA channels and for controlling DMA operations, such as initiating a data transfer between the physical layer device 42 and the PCI interface 46.

An isochronous transmit direct memory access (ITDMA) engine 50 includes two subunits, each of which provides an isochronous channel for moving data from the PCI interface 46 to an isochronous transmit first-in, first-out (ITF) buffer 58. The ITF buffer 58 serves as a temporary storage for isochronous packets to be transmitted via the serial bus 16 and is emptied by an isochronous transmitter in the physical layer device 42.

An isochronous receive direct memory access (IRDMA) engine 56 also provides two subunits, each of which provides an isochronous channel for moving data from a receive first-in, first-out (RF) buffer 60 to the PCI interface 46. The RF buffer 60 serves as a temporary storage for all incoming packets (isochronous and asynchronous). Packets are provided to the RF buffer 60 by receivers in the physical layer device 42.

An asynchronous transmit direct memory access (ATDMA) engine 52 moves asynchronous packets from the PCI interface 46 to an asynchronous first-in, first-out transmit (ATF) buffer 62. The ATF buffer 62 serves as a temporary storage for asynchronous packets to be transmitted via the serial bus 16 and is emptied by an asynchronous transmitter in the physical layer device 42. For each packet sent, the ATDMA engine 52 awaits an acknowledgement to be received from the recipient via the 1394-1995 serial bus 16. If no acknowledgement is received, a retry protocol is implemented.

A receive direct memory access (RDMA) engine 54 moves asynchronous packets from the RF buffer 60 to the PCI interface 46.

Aligners 64, 66, 68, translate the format of data communicated between the buffers 58, 60, 62 and the DMA engines 50, 52, 54, 56. For example, the aligners 64, 66, 68, translate byte alignments between PCI-based data and 32-bit quadlets utilized by the 1394-1995 serial bus 16, add extra zeros when appropriate to form even 32-bit quadlets and perform byte-swapping between big-endian and little-endian environments depending upon the requirements of the CPU 20 (FIG. 2).

A silicon serial number (SSN) interface 70 provides an interface for a serial read only memory (ROM)(not shown) which stores a unique identification number for each node of the 1394 network. A ROM interface 72 provides an interface for a ROM (not shown) which stores configuration information for the interface system 28. Control registers 74 store information which controls operation of the interface system 28. In addition, the control registers 74 handle synchronization of writes to registers, such as those located in the physical layer device 42, which are synchronous with the serial bus 16 clock.

Figure 4:
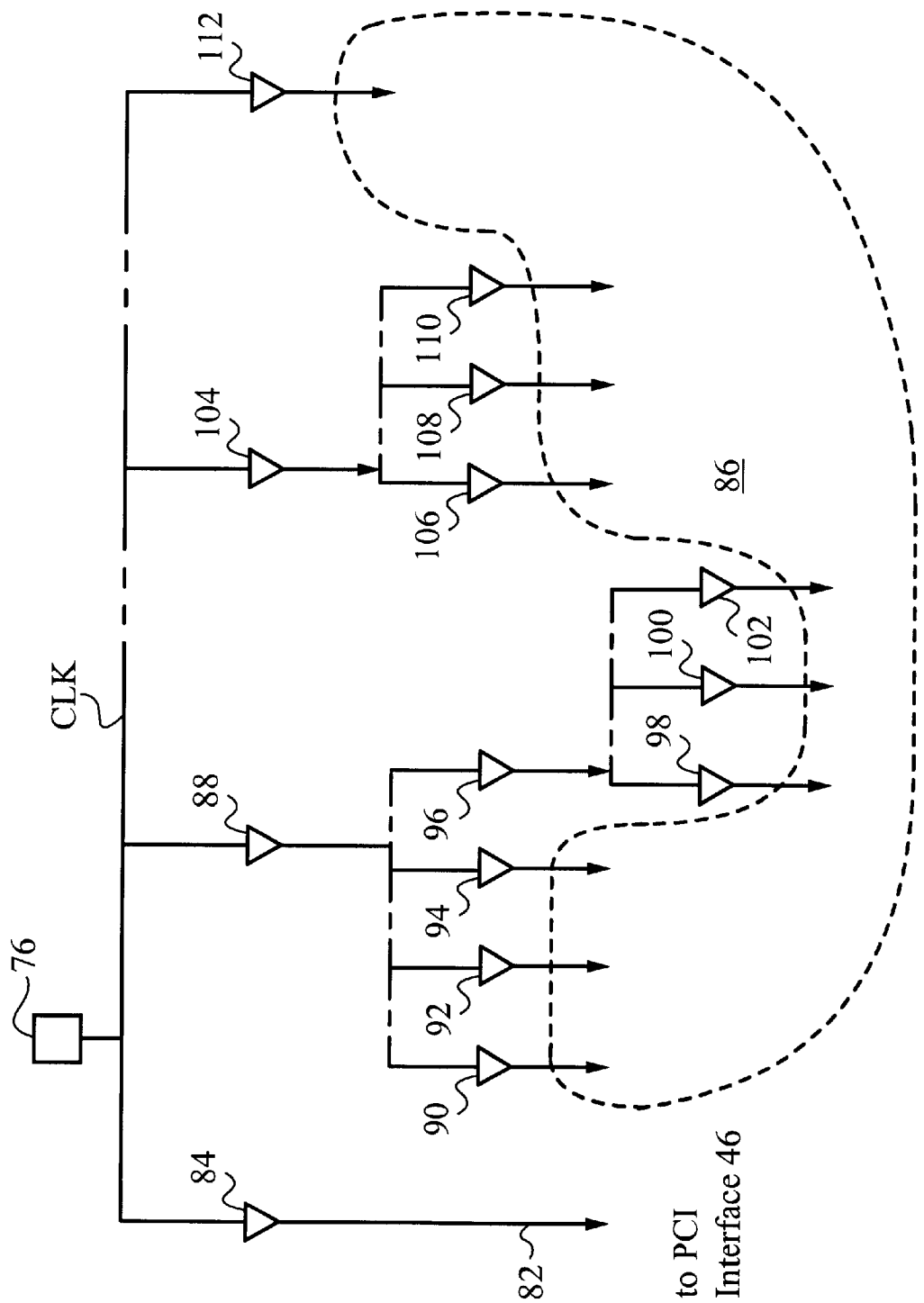
FIG. 4 illustrates a schematic diagram of an unbalanced clock tree according to the present invention.

FIG. 4 illustrates a schematic diagram of an unbalanced clock tree according to the present invention. The clock signal CLK (FIG. 3) is generated by an oscillator 76. A clock signal 82 is derived from the clock signal CLK and provided to the PCI interface 46 (FIG. 3) via a pathway which preferably includes a buffer 84. Alternately, this buffer 84 can be omitted depending upon the specific configuration of the interface circuit 28. A number of other clock signals 86 are also derived from the clock signal CLK and provided to various functional elements of the interface 28 (FIG. 3) via individual pathways which include the buffers 88, 90, 92, 94, 96, 98, 100, 102, 104, 106, 108, 110, 112. It will be apparent that the specific configuration of the clock tree can differ from that shown in FIG. 4 as a matter of design choice depending upon the specific circuit layout chosen.

The functional elements driven by the clock signals 86 preferably include the physical layer device 42 (FIGS. 2–3), the ITDMA engine 50 (FIG. 3), the ATDMA engine 52 (FIG. 3), the RDMA engine 54 (FIG. 3), the IRDMA engine 56 (FIG. 3), the buffers 58, 60, 62 (FIG. 3), the aligners 64, 66, 68 (FIG. 3), the SSN interface 70 (FIG. 3), the ROM interface 72 (FIG. 3) and the control registers 74 (FIG. 3). The amount of time delay required for each clock signal to arrive at its respective functional element from the oscillator 76 increases as the length of the conductor and the number of buffers between the oscillator 76 and the functional element increases.

All of the clock signals 86 are preferably balanced such that each arrives at its respective functional element at substantially the same time. In other words, skew amongst the clock signals 86 is minimized. Preferably, this is accomplished by first determining which functional element is the furthest away from the oscillator 76. The furthest element from the oscillator 76 is expected to be associated with the maximum delay for receiving the clock signal. The propagation delay for the clock signal CLK to arrive at this functional element is then determined. Finally, the delay for each of the remaining clock signals 86 is matched to the delay for the furthest functional element by manipulating the length of conductors which deliver each of the clock signals 86 to its respective functional element (as illustrated by dotted lines in FIG. 4) and by inserting or omitting one or more buffers (such as the buffers 88, 90, 92, 94, 96, 98, 100, 102, 104, 106, 108, 110, 112) between the oscillator 76 and the respective functional element. In this manner, the clock signal is delivered to the functional elements within the interface system 28 (other than the PCI interface 46) at substantially the same time. Accordingly, once balanced, the delays for each of the clock signals 86 are substantially equal. Small differences between these delays which do not adversely affect operation of the interface system 28, however, can still exist.

Note that the PCI interface 46 performs data communication in synchronism with the clock signal 82. Accordingly, an important aspect of the unbalanced clock tree illustrated in FIG. 4, is that the clock signal 82 is configured to arrive at the PCI interface 46 (FIG. 3) with minimum delay. Accordingly, the clock signal 82 is referred to as an "early clock" signal. This helps ensure that required set-up and hold times are satisfied for data communication via the PCI interface 46 (FIG. 3) and the system bus 34 (FIGS. 2 and 3).

The clock signal 82, therefore, is configured for minimum delay between origination by the oscillator 76 (FIG. 3) and arrival at the PCI interface 46 (FIG. 3). In addition, the clock signals 86 are configured to have substantially the same delay as each other (minimum skew) and thereby are substantially simultaneously delivered to all of the functional elements within the interface system 28 (except the PCI interface 46). Because the delay for the clock signals 86 generally depends upon the delay for the clock signal CLK to arrive at the functional element which is furthest away from the oscillator 76, the delay for each of the clock signals 86 to arrive at their respective functional elements is expected to be longer than the delay for the clock signal 82 to arrive at the PCI interface 46. For this reason, the clock tree illustrated in FIG. 4 is unbalanced.

The present invention has been described in terms of specific embodiments incorporating details to facilitate the understanding of the principles of construction and operation of the invention. Such reference herein to specific embodiments and details thereof is not intended to limit the scope of the claims appended hereto. It will be apparent to those skilled in the art that modifications may be made in the embodiment chosen for illustration without departing from the spirit and scope of the invention.

We claim:

1. An apparatus for synchronizing operation of elements of an interface system between a serial bus and a computer system bus, the apparatus comprising:
   a. an oscillator conditioned to generate a clock signal;
   b. a first pathway coupled to the oscillator, wherein the first pathway delivers the clock signal to a first functional element and wherein the first pathway is associated with a first delay for delivering the clock signal to the first functional element; and
   c. a balanced plurality of additional pathways, each coupled to the oscillator, wherein the balanced plurality of additional pathways deliver the clock signal to each of a plurality of additional functional elements included in the digital interface system and wherein each of the plurality of pathways is associated with a respective delay for delivering the clock signal to a respective one of the plurality of additional functional elements, wherein the balanced plurality of additional pathways are balanced with respect to each other such that their respective delays are substantially equal and such that each respective delay is longer than the first delay.

2. The apparatus according to claim 1 wherein the first functional element interfaces to the computer system bus.

3. The apparatus according to claim 1 wherein the serial bus communicates isochronous and asynchronous data packets.

4. The apparatus according to claim 1 wherein the serial bus is an IEEE 1394-1995 serial bus.

5. The apparatus according to claim 1 wherein the system bus is a personal computer interface (PCI) bus.

6. An apparatus for synchronizing operation of elements of an interface system between a serial bus and a computer system bus, the apparatus comprising:

a. means for generating a clock signal;
b. first means for delivering coupled to the means for generating, for delivering the clock signal to a first functional element and having an associated first delay for delivering the clock signal to the first functional element; and
c. second means for delivering coupled to the means for generating, for delivering the clock signal to a plurality of additional functional elements included in the digital interface system and having a plurality of balanced delays for delivering the clock signal to each respective additional functional element, wherein the plurality of balanced delays are substantially equal and wherein the first means is configured such that the first delay is shorter than a shortest one of the balanced delays.

7. The apparatus according to claim 6 wherein the first functional element interfaces to the computer system bus.

8. The apparatus according to claim 6 wherein the serial bus communicates isochronous and asynchronous data packets.

9. The apparatus according to claim 6 wherein the serial bus is an IEEE 1394-1995 serial bus.

10. The apparatus according to claim 6 wherein the system bus is a personal computer interface (PCI) bus.

11. A method of synchronizing operation of elements of an interface system between a serial bus and a computer system bus, the method comprising steps of:
a. generating a clock signal;
b. minimizing a delay time for delivering the clock signal to a first functional element of the interface system thereby forming a minimized delay time; and
c. balancing additional delay times for delivering the clock signal to a plurality of additional functional elements wherein the minimized delay time is shorter than the balanced delay times.

12. The method according to claim 11 further comprising a step of communicating data between the serial bus and the computer system bus.

13. The method according to claim 11 further comprising a step of communicating an isochronous data packet via the interface system.

14. The method according to claim 11 further comprising a step of communicating an asynchronous data packet via the interface system.

15. A computer system comprising:
a. a system bus; and
b. an interface circuit coupled to the system bus and configured for coupling to a serial bus, the interface circuit including:
 (1) a system bus interface circuit coupled to the system bus;
 (2) a plurality of functional elements coupled to the system bus interface circuit for communicating data between the serial bus and the system bus interface circuit; and
 (3) an unbalanced clock delivery system coupled to the system bus interface circuit for delivering a clock signal to the system bus interface circuit and having a first delay time for delivering the clock signal to the system bus interface circuit and coupled to the plurality of functional elements for delivering the clock signal to each of the plurality of functional elements and having a plurality of substantially balanced delay times for delivering the clock signal to each of the plurality of functional elements, wherein the balanced delay times are each longer than the first delay time.

16. The computer system according to claim 15 wherein the serial bus communicates isochronous and asynchronous data packets.

17. The computer system according to claim 15 wherein the serial bus is an IEEE 1394-1995 serial bus.

18. The computer system according to claim 15 wherein the system bus is a personal computer interface (PCI) bus.

19. An interface system for communicating data between a serial bus and a computer system bus, the interface system comprising:
a. a bus interface circuit for providing an interface to the computer system bus;
b. a plurality of direct memory access (DMA) engines coupled to the bus interface circuit;
c. an internal bus coupled to the DMA engines;
d. a plurality of buffers coupled to the internal bus;
e. a interface device coupled to the plurality of buffers wherein the interface device provides an interface to the serial bus;
f. an unbalanced clock tree for providing a clock signal to the bus interface circuit, to the plurality of DMA engines and to the plurality of buffers wherein delay times for providing the clock signal to each of the plurality of DMA engines and buffers are substantially equal and wherein a delay time for providing the clock signal to the bus interface circuit is shorter than any of the delay times for providing the clock signal to each of the plurality of DMA engines and buffers; and
g. an oscillator coupled to the clock tree for generating the clock signal.

20. The interface system according to claim 19 wherein the serial bus communicates isochronous and asynchronous data packets.

21. The interface system according to claim 19 wherein the serial bus is an IEEE 1394-1995 serial bus.

22. The interface system according to claim 19 wherein the system bus is a personal computer interface (PCI) bus.

23. The interface system according to claim 19 further comprising a plurality of aligner circuits, one for each buffer, wherein the aligner circuits are coupled between the internal bus and each respective buffer.

* * * * *